Oct. 1, 1957     F. H. MAY     2,808,424
PROCESS FOR THE MANUFACTURE OF METHYL BORATE
Filed June 22, 1955
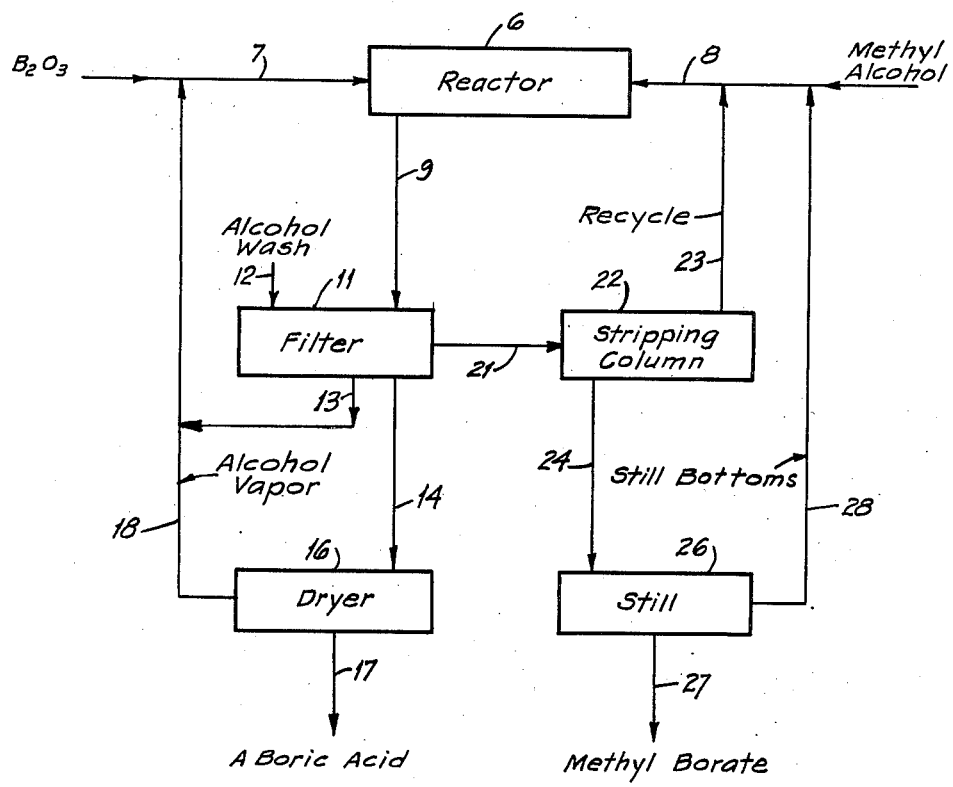
INVENTOR.
Frank H. May
ECKHOFF & SLICK
ATTORNEYS
A MEMBER OF THE FIRM 2,808,424
PROCESS FOR THE MANUFACTURE OF METHYL BORATE Frank Henderson May, Whittier, Calif., assignor to American Potash & Chemical Corporation, a corporation of Delaware Application June 22, 1955, Serial No. 517,259

17 Claims. (Cl. 260—462)

This is a continuation-in-part of my application, Serial No. 467,880, filed November 9, 1954.

This invention relates to the manufacture of alkyl borate esters, particularly those of the lower aliphatic alcohols.

Schlesinger et al. [JACS, 75, 213 (1953)] appear to have been the first to investigate the reaction:

$$3CH_3OH + B_2O_3 \rightarrow (CH_3O)_3B + H_3BO_3$$

The distillate from their stoichiometric reaction contained 79.7% borate, for an over-all yield of 71.6%. When four moles of methanol were used (three for esterification, one for the azeotrope), the distillate contained 75.0% borate, and the over-all yield was 99.4%. The authors concluded that the reaction was inefficient, since only one-half of the boron was utilized. Their method of choice was the direct reaction of boric acid and methanol, and recovery of the azeotrope, with subsequent treatment with lithium chloride to effect the separation of methyl borate of 99.6% purity. Details of experiments with other salts, and with lower-boiling azeotropes, may be found in the same paper. It is believed obvious that formation of the methyl borate-methanol azeotrope provides a considerable limitation in any process wherein methyl borate is formed in the presence of methanol.

I have found that irrespective of the method of preparation employed, the methanol-methyl borate azeotrope can be successfully resolved by reacting the azeotrope with a boron containing material capable of taking up water, e. g., boric oxide, metaboric acid and mesoboric acid. Boric oxide is preferred as the boron source material since it does not introduce any water into the process as do metaboric acid ($H_2O.B_2O_3$) and mesoboric acid ($2H_2O.B_2O_3$). Stated differently, boric oxide has the maximum water sequestering efficiency as compared to metaboric acid and mesoboric acid. In any case, the methyl borate contained in the azeotrope is liberated and additional methyl borate is formed from the liberated methyl alcohol. In addition, a boric acid is formed which can be subsequently reacted as such with further methanol or else converted to boric oxide in a furnace. Thus, in continuous operation, the only materials which need be fed to the process are boric oxide and methanol and the only materials which are removed are water and methyl borate. The process can be considered as one wherein boric oxide, metaboric acid or mesoboric acid and methanol are added to a mass of the azeotrope as one step in the process and from which mass a boric acid and methyl borate are removed as another step in the process.

Depending upon the temperature, the solution composition, the initial reactants and the proportions employed, the stable boric acid solid phase separated from the process may be metaboric acid ($B_2O_3.H_2O$), mesoboric ($B_2O_3.2H_2O$), or orthoboric acid ($B_2O_3.3H_2O$). The latter is obviously the most efficient for removal of water and the process is preferred wherein orthoboric acid is removed as the stable solid phase. Also, the use of excess boric oxide and the crystallization of either the meso- or meta-boric acids generally yields a solution containing considerable dissolved $B_2O_3$ which can only be recovered and recycled as a still residue along with an approximately equal quantity of unrecovered ester. Apparently the $B_2O_3$-alcohol content corresponds to an equivalent $H_2O$ partial pressure for the system which in turn determines the stable solid phase, each of which probably has corresponding $H_2O$ partial pressures. The use of excess boric oxide and the crystallization of either the mesoboric or metaboric acid generally yield a solution containing considerable dissolved boric oxide which can only be recovered and recycled as a still residue along with an approximately equal quantity of unrecovered ester.

While in the foregoing I have considered only methyl borate, the invention is also applicable to production of other esters, e. g., those of any other aliphatic alcohols which form alcohol-ester azeotropes such as ethyl alcohol, isopropyl alcohol and the higher primary, secondary and tertiary aliphatic alcohols.

It is in general the broad object of the present invention to provide a novel process for the production of alkyl borate esters, particularly methyl borate.

Another object of the present invention is to provide a continuous process for the manufacture of methyl borate in which the methyl borate-methanol azetrope is utilized as a source of further methyl borate.

A further object of the invention is to provide a process for the manufacture of an alkyl borate in which the aliphatic alcohol-alkyl borate azeotrope is utilized as a source of further alkyl borate.

The invention includes other objects and features of advantage which will appear hereinafter wherein the practices illustrated by the present invention are set forth. The drawing accompanying and forming a part hereof is a flow sheet illustrating one manner of practicing the invention.

Referring to the drawing, the following brief and general description of the process as applied to production of methyl borate will suffice for a better understanding of the procedure to be utilized and the advantages. A reactor 6 is provided into which the boron containing material capable of taking up water, e. g., metaboric acid, mesoboric acid or boric oxide, is fed through line 7 and the methyl alcohol-containing material, e. g., methyl alcohol-methyl borate azeotrope, methanol or a mixture of these, is fed through line 8. The effluent from the reactor is withdrawn through line 9, cooled in a cooler (not shown), and the solid boric acid present is removed on filter 11. The solid cake on the filter can be given a wash with methyl alcohol supplied as through line 12 and removed through line 13 and returned to the reactor 6 through line 18. The solid cake is removed from the filter and passed through line 14 and is passed to a drier 16, from which boric acid is removed as through line 17, while the methyl alcohol vapor is removed and returned through line 18 to the reactor 6. The boric acid may be converted to boric oxide in a suitable furnace or it may be reacted with additional methanol to form additional azeotrope and water, the azeotrope being similarly treated with a boron-containing material capable of taking up water.

The filtrate is taken off through line 21, heated and sent to a stripping column 22. The stripping column 22 serves to separate the readily volatile materials from the relatively high boiling materials. The relatively volatile material is mainly azeotrope; the composition will depend upon the efficiency of the column and the pressure employed. The relatively volatile material is sent overhead through line 23 and returned to feed line 8. The relatively high boiling materials, generally comprising the ester, are removed through line 24 into a still 26, which serves to separate the ester, which is removed through line 27, while other material, generally characterized as still bottoms and which may include trimethoxy boroxine ($(CH_3O)_3B.B_2O_3$), are returned through line 28 to the feed line 8. The composition of the recycle and still bottoms will depend upon the efficiency of the apparatus and the pressure employed. In any continuous operation wherein steady-state conditions are established, the composition of each of these will be substantially constant and uniform.

The practice of the present invention will become further apparent from a consideration of the following, in which I have outlined the present preferred procedures followed in practicing the present invention.

*Example 1.*—The required quantity of methanol was weighed into a five-liter-neck flask fitted with an efficient, tap water cooled, reflux condenser, a heating mantle, a thermometer, and a sealed motor-driven agitator. To avoid moisture pick-up during the reaction, the upper end of the condenser was equipped with a drying tube filled with anhydrous $CaSO_4$. The methanol was first heated up to approximately 50° C. with agitation and $B_2O_3$ addition was then started and maintained at a controlled rate in order to keep the reaction temperature just below the reflux temperature. This necessitated replacing the heating mantle with a cooling bath during the $B_2O_3$ addition. In all preparations, the required $B_2O_3$ was added within a half-hour period.

Following the $B_2O_3$ addition, the cooling bath was replaced with a heating mantle and the slurry heated to a steady reflux temperature during a one-hour period. The slurry was next cooled rapidly below 15° C. with an ice water bath (usually within a one-hour period) and a plug pipette sample of cooled filtrate was obtained for boron analysis. The boric acid solids were filtered on Buchner funnels under vacuum.

The clear filtrates obtained were saved for further treatment. The solids were given a petroleum ether displace wash and air dried, the washes being discarded. The air dried solids were analyzed for boron content.

The following Table I lists data obtained during the preparation of the methyl borate solutions using absolute methanol and boric as raw materials.

TABLE I

| Run No. | MS-5 | MS-8 | MS-9 |
| --- | --- | --- | --- |
| $CH_3OH$, grams | 2,500 | 2,500 | 2,500 |
| $B_2O_3$, grams | 2,083 | 1,830 | 1,830 |
| Excess $B_2O_3$ over theo.,[1] percent | 15 | 0 | 0 |
| Initial Reflux, T° C | | 63 | 63 |
| Final Reflux, T° C | 76 | 71 | 71 |
| Cooled Slurry, T° C | 3 | 3 | 2 |
| Cooled Slurry, grams | 4,569 | 4,315 | 4,317 |
| Air dried solids, grams | 1,686 | 1,643 | 1,642 |
| Percent B | 16.93 | 16.98 | 17.01 |
| Filtrate, grams | 2,214 | 2,004 | 2,031 |
| Percent B | 12.38 | 10.74 | 10.87 |

[1] Based upon equivalent quantities as represented by the equation:

$$3CH_3OH + B_2O_3 \longrightarrow H_3BO_3 + (CH_3O)_3B$$

The individual filtrates and composites were distilled at atmospheric pressure. Thirty-inch distillation columns, filled with protruded stainless steel packing, and equipped with Whitmore-Lux total reflux, variable take-off distillation heads, were used to distill off the alcohol-ester cuts. The accumulated distillates and residues were set aside for further treatment.

Table II summarizes the data obtained during the distillation of the several batches of methyl borate solution.

TABLE II

| Run No. | MS-5 | MS-8 | MS-9 |
| --- | --- | --- | --- |
| Wt. filtrate distilled, grams | 2,209 | 1,998 | 2,031 |
| Wt. distillate, grams | 1,388 | 1,659 | 1,730 |
| Percent B in distillate | 8.89 | 9.07 | 9.07 |
| Head Temp., °C | 55-67 | 56.67 | 55-64 |
| Pot Temp., °C | 75-145 | 67-145 | 70-149 |
| Wt. residue (by diff.), grams | 821 | 339 | 301 |
| Percent B in residue (calc.) | 18.28 | 18.91 | 21.02 |

The following compositions of residues, distillates and filtrates were calculated from analytical data and material balance values.

TABLE III

*Calculated compositions of process liquors*

| Run No. | MS-5 | MS-8 | MS-9 |
| --- | --- | --- | --- |
| Residue: | | | |
| Percent $B_2O_3$ | 38.1 | 41.1 | 51.3 |
| Percent $(CH_3O)_3B$ | 61.9 | 58.9 | 48.7 |
| Distillate: | | | |
| Percent $CH_3OH$ | 14.6 | 12.9 | 12.9 |
| Percent $(CH_3O)_3B$ | 85.4 | 87.1 | 87.1 |
| Filtrate: | | | |
| Percent $CH_3OH$ | 9.2 | 10.7 | 11.0 |
| Percent $(CH_3O)_3B$ | 76.6 | 82.3 | 81.4 |
| Percent $B_2O_3$ | 14.2 | 7.0 | 7.6 |

A portion of the distillate from MS-9 and containing 87.1% methyl borate was fractionated to produce the azeotrope and form ester, with the results listed in Table IV below:

TABLE IV

| | |
| --- | --- |
| Weight of solution distilled, grams | 1,263 |
| Percent $(CH_3O)_3B$ | 87.1 |
| Weight of azeotrope fraction, grams | 630 |
| Head temperature, ° C | 54.5-58 |
| Pressure | Atm. |
| Percent $(CH_3O)_3B$ | 74.5 |
| Weight of ester fraction, grams | 633 |
| Head temperature, ° C | 67.5-69 |
| Pressure | Atm. |
| Percent $(CH_3O)_3B$ | 99.8 |

Methanol-methyl borate azeotrope produced from fractionation of similar distillates, along with the still residue from the various preparations, were set aside to be later combined for the recovery and production of further quantities of pure ester.

*Example 2.*—The process can be operated on a batch or continuous basis. Since the separate steps of reacting the methanol and boric oxide, separating the boric acid and separation and recovery of the methyl borate from the recycle azeotrope and still bottoms can be practiced a step-at-a-time, one can consider that the process is a cyclic one and the invention can be so practiced, if desired, the several steps following one another rather than being practiced simultaneously. In the following table, I have set forth the results obtained upon a total of seven cyclic operations of the process and in which the several values are given in pounds:

TABLE V

| Cycle No. | (1) | (2) | (3) | (4) | (5) | (6) | (7) |
| --- | --- | --- | --- | --- | --- | --- | --- |
| Raw Materials: | | | | | | | |
| $B_2O_3$ | 1,408 | 997 | 906 | 886 | 881 | 881 | 881 |
| $CH_3OH$ | 1,924 | 1,375 | 1,253 | 1,226 | 1,220 | 1,220 | 1,220 |
| Recycle Materials: | | | | | | | |
| In $\{B_2O_3$ | | 134.4 | 164.3 | 171.0 | 172.4 | 172.4 | 172.4 |
| In $\{CH_3OH$ | | 170.7 | 208.6 | 217.1 | 218.9 | 218.9 | 218.9 |
| In $\{(CH_3O)_3B$ | | 654.3 | 799.9 | 832.1 | 839.4 | 839.4 | 839.4 |
| Out $\{B_2O_3$ | 134.4 | 164.3 | 171.0 | 172.4 | 172.8 | 172.8 | 172.8 |
| Out $\{CH_3OH$ | 170.7 | 208.6 | 217.1 | 218.9 | 219.4 | 219.4 | 219.4 |
| Out $\{(CH_3O)_3B$ | 654.3 | 799.9 | 832.1 | 839.4 | 840.9 | 840.9 | 840.9 |
| Wet Solids | 1,769 | 1,421 | 1,344 | 1,327 | 1,325 | 1,323 | 1,323 |
| Methyl Borate Product | 603.8 | 737.9 | 767.8 | 774.3 | 775.9 | 775.9 | 775.9 |
| Filtrate | 1,563 | 1,911 | 1,988 | 2,005 | 2,009 | 2,009 | 2,009 |

In the above, the total raw materials fed included 6840 pounds of boric oxide and 9439 pounds of methanol. As a product, 5212 pounds of 100% methyl borate were obtained, while 877 pounds of an azeotrope containing 75% methyl borate remained, together with a residue of 356 pounds having a composition of 48.6% $B_2O_3$ and 51.4% methyl borate. The total net solids recovered weighed 9830 pounds with a 28.5% liquor entrainment.

While in the foregoing I have only dealt with methanol-methyl borate azeotrope as derived from the reaction of methyl alcohol and boric oxide, it will be obvious to those skilled in the art that the azeotrope can be derived from the reaction of other materials with methanol; for example, boric acid as such or as produced by the addition of methanol and sulfuric acid to borax, as is indicated in the aforementioned article by Schlesinger.

The azeotrope, produced as described by one or another of the methods described herein, can be introduced into the process as a source of alcohol raw material along with added $B_2O_3$ and recycled azeotrope and still residue. If all or the majority of the alcohol raw material is added to the process as a 70–75% methyl borate-methyl alcohol solution, the process may be considered as a method for separating and recovering the pure ester from the azeotrope. Such a procedure can be on a continuous basis in which case the ester solution, recycled ester and still residue become practically constant in composition. Thus, starting with an average ester solution, the process includes distilling the solution to produce an approximately 75% methyl borate azeotrope fraction, 50–50% $B_2O_3$-methyl borate still residue, and a pure methyl borate fraction as product. This procedure was followed exactly in a previous example (MS-9) with comparable results. The complete process further includes recycling the azeotrope and still residues and reacting with additional azeotrope and $B_2O_3$ raw materials to produce further ester solution and so complete the cycle. To demonstrate this final step in the process, and thus the complete cycle, recycle quantities of azeotrope and still residues were combined with additional azeotrope and $B_2O_3$ in the proper ratio to produce an equivalent 2,000 grams of average composition starting ester solution, based upon 75% methyl borate azeotrope and a recycled 50–50% $B_2O_3$-methyl borate still residue; the material balance quantities of materials entering the reaction step are listed in Table VI below:

TABLE VI

| Reaction Step | Material Balance (Grams) | | | |
|---|---|---|---|---|
| | $B_2O_3$ | $(CH_3O)_3B$ | $CH_3OH$ | Total |
| Azeotrope recycle | | 690 | 230 | 920 |
| Azeotrope feed | | 602 | 201 | 803 |
| $B_2O_3$ feed | 145 | | | 145 |
| Recycle still bottoms | 150 | 150 | | 300 |
| Total | 295 | 1,442 | 431 | 2,168 |

In carrying out the reaction, the azeotrope and still bottoms were mixed together and heated to 50° C. in a five liter, three-necked flask, equipped with reflux condenser, motor-driven, sealed agitator and thermometer. The boric oxide was added at a controlled rate to the heated solution while maintaining the temperature below boiling. At the end of the $B_2O_3$ addition, the mixture was heated to reflux (68° C.) for a short period and then cooled and seeded with $H_3BO_3$ crystals. The resulting cooled (10° C.) slurry was filtered using vacuum and the filtrate sampled and distilled with the results listed in Table VII below:

TABLE VII

| | |
|---|---|
| Total weight slurry, grams | 2,171 |
| Weight filtrate, grams | 1,900 |
| Percent B in filtrate | 10.92 |
| Weight of dry solids, grams | 154 |
| Weight of filtrate distilled, grams | 1,896 |
| Total weight of distillate, grams | 1552.5 |
| Head temp., °C. | 54.5–68.5 |
| Pot temp., °C. | 60–152 |
| Pressure | Atm. |
| Percent methyl borate in distillate | 85.87 |
| Weight of still residue, grams | 343.5 |
| Percent B in residue (calc.) | 19.84 |

From these values, the composition of the filtrate and subsequently the yield of ester based upon material balance values for the recycle azeotrope and still residue can be evaluated as listed in Table VIII.

TABLE VIII

| | Percent | Wt. (grams) |
|---|---|---|
| Filtrate: | | |
| $(CH_3O)_3B$ | 80.13 | 1,523 |
| $CH_3OH$ | 11.60 | 220 |
| $B_2O_3$ | 8.27 | 157 |
| Total | | 1,900 |
| Recycle azeotrope: | | |
| $(CH_3O)_3B$ | 75 | 660 |
| $CH_3OH$ | 25 | 220 |
| Total | | 880 |
| Recycle still bottoms: | | |
| $(CH_3O)_3B$ | 50 | 157 |
| $B_2O_3$ | 50 | 157 |
| Total | | 314 |
| Methyl borate product: | | |
| $(CH_3O)_3B$ | 100 | 706 |

To illustrate the utility of boric oxide in the successful resolution of an isopropyl alcohol-isopropyl borate azeotrope, a mixture resulting from the manufacture of isopropyl borate from isopropyl alcohol and boric oxide and containing 485.2 grams of isopropyl ester, 780.8 grams of isopropyl alcohol, and 97 grams of $B_2O_3$ was placed in a 3-liter, 3-necked flask fitted with a reflux condenser, thermometer, agitator and heating mantle. Moisture was excluded by means of calcium sulfate drying tubes. 204.6 grams of additional boric oxide were added in increments to the alcohol azeotrope mixture, producing a solid slurry of boric acid and causing the temperature to rise to the reflux temperature, 99° C., upon final addition. The temperature was maintained at reflux for one-half hour and then reduced by replacing the heating mantle with an ice bath. Samples of the filtrate were taken at 34°, 21°, and 8° C. The total cooling time was three hours. The 8° C. slurry was filtered using a Buchner funnel and the filtrate distilled. The solids were washed with petroleum ether and air dried. The weight of washed and air dried solids was 232 grams, corresponding to a yield of 142% based on the amount of $B_2O_3$ added. The additional ester yield, of course, was obtained from the release of ester in the azeotrope.

In a similar manner, ethyl alcohol-ethyl borate azeotrope resulting from the direct reaction of boric oxide and ethanol were treated with boric oxide at 90° C. until all the solids present dissolved. More specifically, a mixture containing 1,599 grams of ethyl borate and 1,618 grams of ethyl alcohol were treated with 815.3 grams of boric oxide. The mixture was heated to 90° C., upon which all solids dissolved. It was then cooled to 60° C., seeded with orthoboric acid crystals, agitated for three hours, then cooled to 5° C. and sampled. The solids were filtered off and air dried and the filtrate was distilled to obtain 2,638 grams of the ethyl ester, representing a 210% yield based upon the added $B_2O_3$.

In a similar manner, using the quantity of boric oxide required stoichiometrically, the borate esters of tri-normal-propyl alcohol and tri-1,3-dimethyl butyl alcohol were prepared. The alcohol azeotrope was separated in each instance and treated with further boric oxide to resolve the azeotrope, release the ester and provide additional ester.

In the foregoing examples, one can resolve the alcohol-ester azeotrope with either metaboric acid or mesoboric acid although boric oxide is preferred since it has the greatest water sequestering value of the three materials.

I claim:

1. In a process of producing trimethyl borate, the steps of forming a mixture of trimethyl borate and an azeotrope consisting of trimethyl borate and methanol, and distilling the mixture at a temperature sufficient to vaporize the azeotrope and leave trimethyl borate as a product, recovering the azeotrope, and reacting the azeotrope with boric oxide to form additional trimethyl borate.

2. In a process of producing trimethyl borate, the steps of reacting boric oxide and methanol-trimethyl borate azeotrope to form a solid phase of boric acid and additional trimethyl borate and recovering the trimethyl borate.

3. In a process of producing trimethyl borate, the steps of reacting boric oxide and methanol-trimethyl borate azeotrope to form solid phase orthoboric acid and additional trimethyl borate, and recovering the trimethyl borate.

4. In a process of producing a borate ester of an alcohol selected from the group consisting of a lower alkyl primary alcohol and a lower alkyl secondary alcohol, the steps of reacting boric oxide and an alcohol-borate ester azeotrope to form a solid phase boric acid and additional borate ester, and recovering the borate ester.

5. In a process of producing trimethyl borate, the steps of reacting boric oxide and methanol-trimethyl borate azeotrope to form a boric acid and additional trimethyl borate, recovering the boric acid, reacting the recovered boric acid with additional methanol to form further methanol-trimethyl borate azeotrope, reacting the further azeotrope with boric oxide to form trimethyl borate, and recovering the trimethyl borate.

6. A process for producing trimethyl borate comprising reacting boric oxide and methanol to produce boric acid and methanol-trimethyl borate azeotrope, recovering the azeotrope, reacting the recovered azeotrope with boric oxide to produce additional trimethyl borate and boric acid, and recovering the trimethyl borate.

7. A process for producing trimethyl borate comprising reacting boric oxide and methanol to produce methanol-trimethyl borate azeotrope, reacting said azeotrope with boric oxide to produce additional trimethyl borate, and recovering the trimethyl borate.

8. A process for producing trimethyl borate comprising reacting boric oxide and methanol to produce boric acid and methanol-trimethyl borate azeotrope, recovering the azeotrope, reacting the recovered azeotrope with boric oxide to produce additional trimethyl borate and a solid phase boric acid, separating and recovering the trimethyl borate and the solid phase boric acid, reacting the recovered boric acid with methanol to produce additional trimethyl borate-methanol azeotrope and water, and reacting said additional trimethyl borate-methanol azeotrope with boric oxide to form further trimethyl borate.

9. A cyclic process for producing trimethyl borate comprising adding boric oxide and methanol to a mass of methanol-trimethyl borate azeotrope in a reaction zone to form a mass containing boric acid, trimethyl borate and said azeotrope, separating solid phase boric acid and trimethyl borate from said mass and returning azeotrope to the first step aforementioned.

10. In a process of producing trimethyl borate, the steps of reacting boric oxide and methanol-trimethyl borate azeotrope to form a boric acid and additional trimethyl borate, recovering the boric acid as a solid phase, and converting the recovered boric acid to boric oxide.

11. In a process of producing a borate ester of an alcohol selected from the group consisting of a lower alkyl primary alcohol and a lower alkyl secondary alcohol, the step of reacting boric oxide and an alcohol-ester azeotrope to form additional alkyl borate ester and a boric acid.

12. In a process of producing a borate ester of an alcohol selected from the group consisting of a lower alkyl primary alcohol and a lower alkyl secondary alcohol, the step of reacting a material selected from the group consisting of metaboric acid, mesoboric acid and boric oxide and an alcohol-ester azeotrope to form additional alkyl borate ester and a boric acid containing more water than the material added.

13. In a process of producing trimethyl borate, the steps of reacting a methyl alcohol-trimethyl borate azeotrope with a material selected from the group consisting of metaboric acid, mesoboric acid and boric oxide to form trimethyl borate and orthoboric acid as a solid phase, filtering the mixture to remove orthoboric acid as a solid phase, and recovering the trimethyl borate.

14. In a process of producing triethyl borate, the steps of reacting an ethyl alcohol-triethyl borate azeotrope with a material selected from the group consisting of metaboric acid, mesoboric acid and boric oxide to form triethyl borate and orthoboric acid as a solid phase, filtering the mixture to remove orthoboric acid as a solid phase, and recovering the triethyl borate.

15. In a process of producing triisopropyl borate, the steps of reacting an isopropyl alcohol-triisopropyl borate azeotrope with a material selected from the group consisting of metaboric acid, mesoboric acid and boric oxide to form triisopropyl borate and orthoboric acid as a solid phase, filtering the mixture to remove orthoboric acid as a solid phase, and recovering the triisopropyl borate.

16. In a process of producing a tripropyl borate ester, the steps of reacting a propyl alcohol-tripropyl borate ester azeotrope with a material selected from the group consisting of metaboric acid, mesoboric acid and boric oxide to form tripropyl borate ester and orthoboric acid as a solid phase, filtering the mixture to remove orthoboric acid as a solid phase, and recovering the tripropyl borate ester.

17. In a process of producing a tributyl borate ester, the steps of reacting the butyl alcohol-tributyl borate ester azeotrope with a material selected from the group consisting of metaboric acid, mesoboric acid and boric oxide to form tributyl borate ester and orthoboric acid as a solid phase, filtering the mixture to remove orthoboric acid as a solid phase, and recovering the tributyl borate ester.

References Cited in the file of this patent

Schlesinger et al.: JACS 75, 213 (1953).